May 14, 1963    M. E. GRUNZKE    3,089,463
LIQUID DISPENSING DEVICE
Filed Oct. 11, 1961
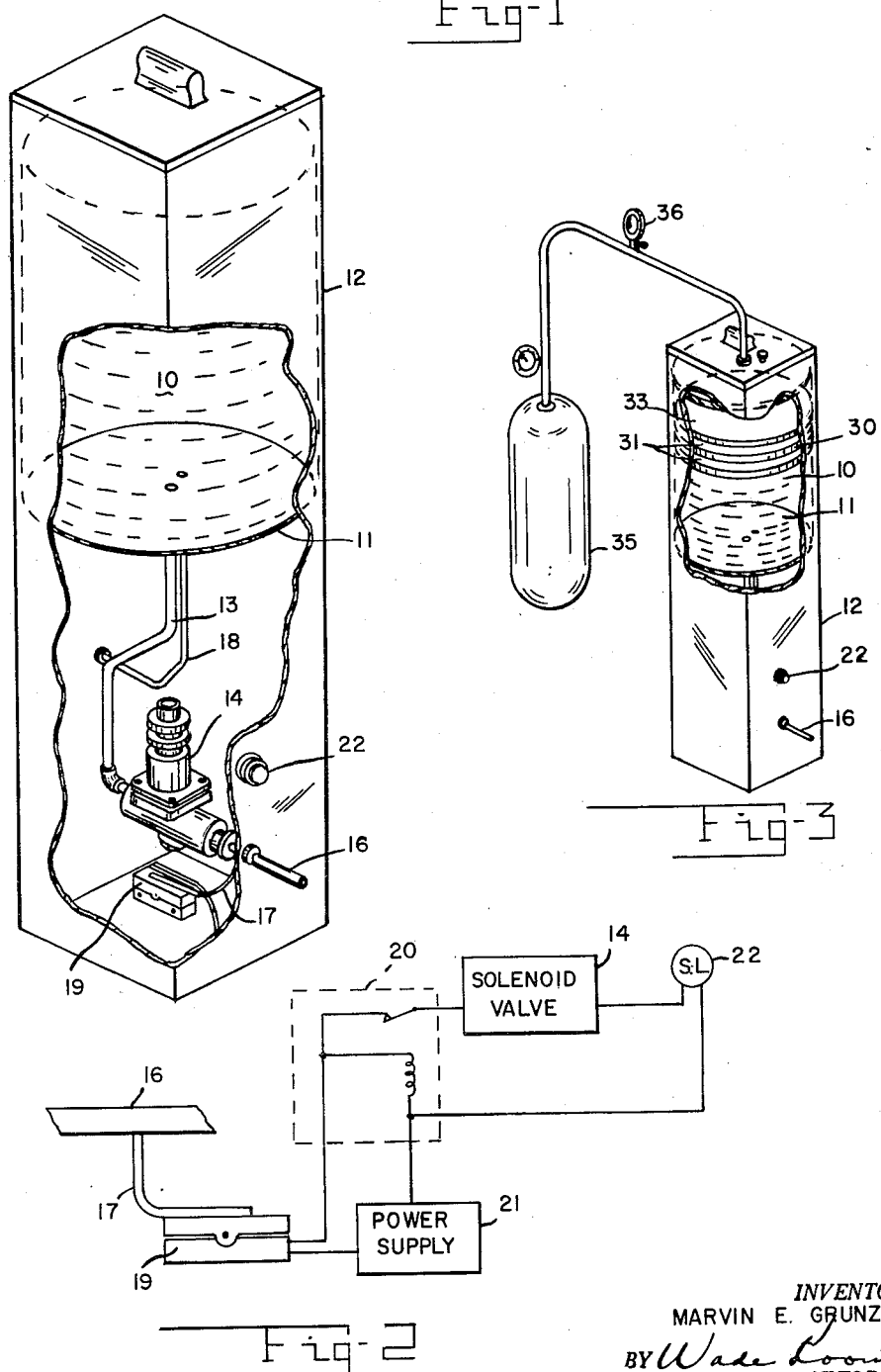
INVENTOR.
MARVIN E. GRUNZKE
BY
ATTORNEY
AGENT

United States Patent Office 3,089,463
Patented May 14, 1963

3,089,463
LIQUID DISPENSING DEVICE
Marvin E. Grunzke, Holloman AFB, N. Mex., assignor to the United States of America as represented by the Secretary of the Air Force
Filed Oct. 11, 1961, Ser. No. 144,520
1 Claim. (Cl. 119—71)
(Granted under Title 35, U.S. Code (1952), sec. 266)

The invention described herein may be manufactured and used by or for the United States Government for governmental purposes without payment to me of any royalty thereon.

This invention relates to a device for dispensing liquids in controlled amounts for use in primate studies.

One object of the invention is to provide a device which makes use of a natural sucking response for providing drink for the animal being tested.

Another object of the invention is to provide a device capable of providing drink for the animal being tested at the time that the animal is prepared to drink.

A further object of the invention is to provide a device capable of providing drink for an animal being tested wherein the liquid is maintained in a closed sanitary condition and wherein the liquid will not spill by movement or bumping of the test chamber.

A still further object of the invention is to provide a device for providing drink for an animal being tested capable of use in various environments such as pressure, vibration and zero gravity.

These and other objects will be more fully understood from the following detailed description taken with the drawings, wherein:

FIG. 1 is a partially cut away schematic perspective view of a liquid dispensing device according to one embodiment of the invention.

FIG. 2 is a schematic block diagram partially in block form of the circuit used with the device of FIG. 1.

FIG. 3 is a reduced schematic perspective view of a modification of the device of FIG. 1 for use at zero gravity.

Standard laboratory apparatus used for controlling thirst-motivated behavior employs a dipper and well arrangement in which a motor and mechanical linkage move the dipper out of the well and into a position where the subject can obtain the liquid from the dipper for a fixed period of time. The dipper then returns into the well away from the subject's reach. For small animals such as rats and other rodents, this method is satisfactory but the design features are not readily applicable to primate studies.

According to this invention a solenoid valve controlled by a microswitch and timer presents a predetermined amount of liquid through a drinking tube to the animal being tested. A lever attached to the drinking tube acts to control the microswitch to close the solenoid valve. The timer acts to open the circuit to the solenoid valve after a predetermined time to cut off the flow of liquid until the microswitch is again operated by a sucking response.

Referring to FIG. 1 of the drawing, liquid 10 is stored in a tank 11 within a container 12. A tube 13 leads from the tank 11 to a solenoid-controlled valve indicated generally at 14. The particular type of solenoid valve used forms no part of this invention. A lip lever drinking tube 16 is attached to the valve 14. A lever 17 inserted in the bottom wall or secured to the bottom of the drinking tube 16 is attached to a microswitch 19 as shown in FIG. 2. The drinking tube is caused to be compressed by any well-known means such as by providing an oval drinking tube or by weakening the tube side walls to thereby operate the lever and microswitch. A tube 18 is provided for draining and filling the tank 11.

The microswitch 19 is connected to a timer 20 of conventional construction, connected in a circuit with solenoid 14, power supply 21 and signal lamp 22. The timer may be a time delay relay as shown in FIG. 2 or any other means that will stop the flow of liquid a predetermined time after the microswitch is operated and which will prevent further flow until the switch 19 is again operated. The timer need be used only when it is desired that only a predetermined amount of liquid be delivered for each sucking response and may be omitted for some uses of the device. Also, other time sequences may be used if desired.

In the operation of the device, a sucking response on the lip lever drinking tube 16 will create a partial vacuum in the tube so that atmospheric pressure or whatever pressure exists between container 12 will compress the tube so that lever 17 will operate the microswitch 19, to close the circuit through the power supply 21, signal light 22 and solenoid 14 to thus provide a supply of liquid to the animal being tested. A predetermined time after switch 19 is operated, timer 20 acts to open the circuit through the solenoid thus cutting off the flow of liquid until the microswitch is again operated. As can be seen with the circuit shown, the flow of liquid will also be stopped if the animal stops drinking thus opening switch 19. This will prevent spilling of the liquid. The signal lamp 22 is lit when solenoid 14 is operated and indicates when drink is provided and is off when liquid flow stops.

With the device shown in FIG. 1, a gravity feed system is used for supplying the liquid. When the device is to be used as a zero gravity liquid dispenser, gravity feed is incapable of operation. For this purpose, the modification shown in FIG. 3 may be used. In this figure, the liquid supply tank is modified to provide a pressure piston 30 inside the tank. A pair of O rings 31 are provided between the piston and the wall of the tank to provide a seal. Compressed air is supplied to the space 33 above the piston 30 from a pressure tank 35. A standard pressure regulator 36 is provided to maintain the pressure above piston 30 at the desired pressure. The air pressure used is determined by the particular use for the device, the resistance to flow in the tube 13, and rate of flow desired.

There is thus provided a device for dispensing liquids in controlled amounts.

While certain specific embodiments have been described, it is obvious that numerous changes may be made without departing from the general principles and scope of the invention.

I claim:

A device for dispensing liquids to a test subject on demand, comprising: liquid supply tank, a piston within said liquid supply tank, means for supplying air under pressure to said piston to maintain a predetermined pressure on the liquid in said supply tank, a drinking tube, a solenoid valve connected between said supply tank and said drinking tube, a power supply, a microswitch connected in series with said power supply and said solenoid, means connected in the circuit between said power supply and said solenoid for de-energizing said solenoid a predetermined time after said microswitch is closed, and means controlled by a sucking action on said drinking tube for operating said microswitch to thereby permit the flow of liquid for only a predetermined time after the test subject starts sucking on said drinking tube.

References Cited in the file of this patent

UNITED STATES PATENTS

| | | |
|---|---|---|
| 622,384 | Armstrong | Nov. 27, 1900 |
| 2,835,252 | Mauchel | May 20, 1958 |
| 3,037,481 | Kloss | June 5, 1962 |